United States Patent [19]

Jankkila

[11] Patent Number: 4,761,892

[45] Date of Patent: Aug. 9, 1988

[54] APPARATUS FOR MEASURING THE LENGTH OF ELECTRODES IN AN ELECTRIC FURNACE

[75] Inventor: Martti J. Jankkila, Tornio, Finland

[73] Assignee: Outokumpu Oy, Helsinki, Finland

[21] Appl. No.: 935,185

[22] Filed: Nov. 26, 1986

[30] Foreign Application Priority Data

Nov. 28, 1985 [FI] Finland ................................ 854724

[51] Int. Cl.[4] .............................................. G01B 7/28

[52] U.S. Cl. .................................. 33/556; 33/169 R; 33/172 B

[58] Field of Search ..................... 33/172 B, 501, 556, 33/558, 572, 613, 169 R

[56] References Cited

U.S. PATENT DOCUMENTS

| | | | |
|---|---|---|---|
| 3,714,715 | 2/1973 | Coes, Jr. | 33/556 |
| 3,816,932 | 6/1974 | Legille | 33/558 |
| 3,872,598 | 3/1975 | Bachner et al. | 33/172 B |
| 4,170,830 | 10/1979 | Weber | 33/556 |

*Primary Examiner*—Harry N. Haroian

*Attorney, Agent, or Firm*—Dellett, Smith-Hill & Bedell

[57] ABSTRACT

The invention relates to an apparatus for measuring the length of the electrodes in an electric furnace, wherein by aid of the apparatus of the invention, into the furnace there is inserted a measuring rod which feels the end of the electrode in the furnace, and thus the distance of the electrode located in the material bed is detected with respect to the furnace bottom.

8 Claims, 2 Drawing Sheets

APPARATUS FOR MEASURING THE LENGTH OF ELECTRODES IN AN ELECTRIC FURNACE

Figure 1:
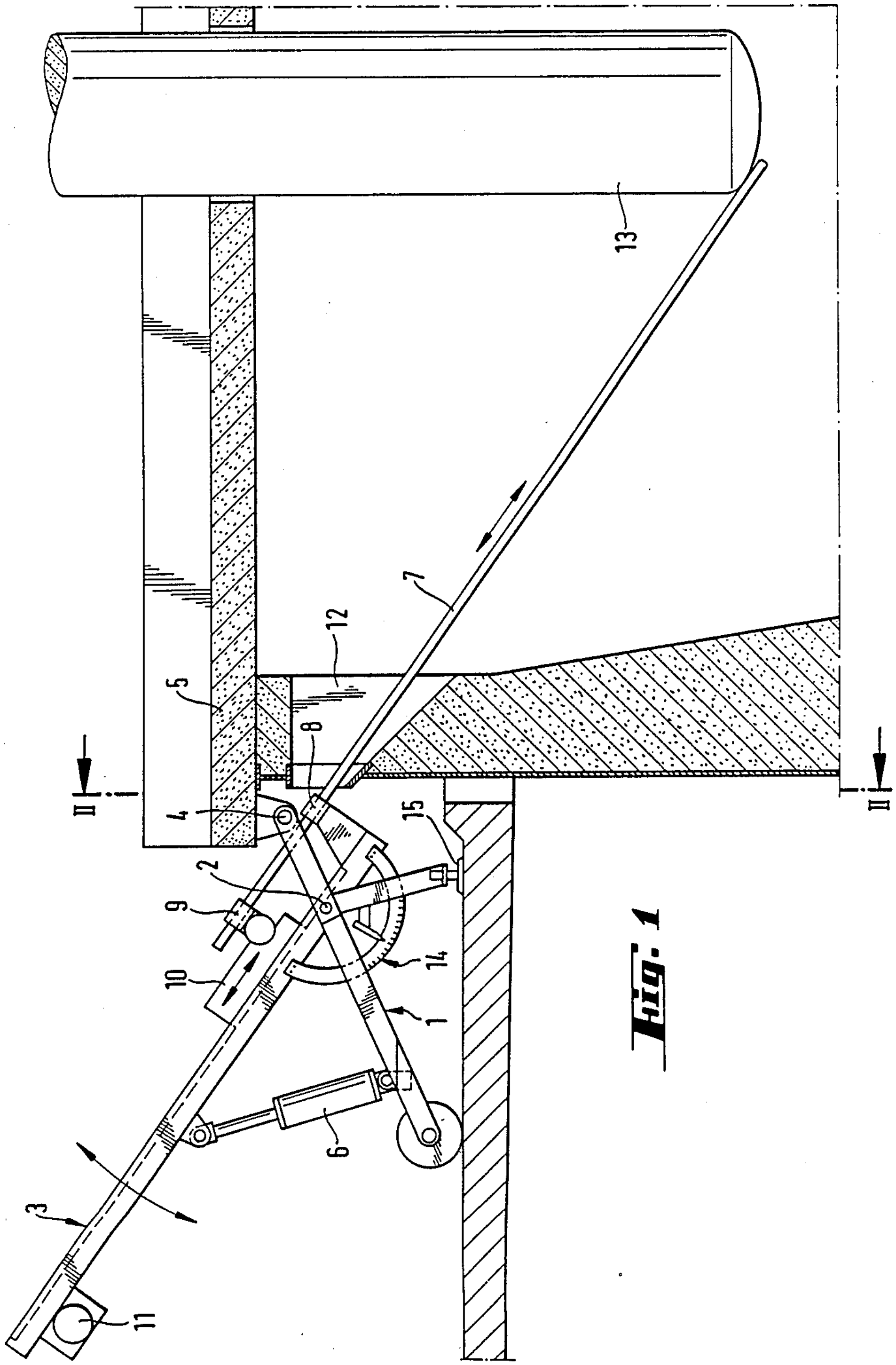

The present invention relates to an apparatus for measuring the length of electrodes in an electric furnace, so that by employing the apparatus of the invention, into the furnace there is inserted a measuring rod, which is used for detecting the electrode end in the furnace, and thus the distance of the electrode, located in the material bed, is defined with respect to the furnace bottom.

For a professional in the said field, it is obvious that the electrodes of an electric-arc furnace cannot be located too near the bottom, because this makes both the furnace lining and the bottom break; on the other hand, if the electrodes are located too high up with respect to the furnace bottom, the current efficiency is diminished. Consequently, even if the optimal height of the electrode ends within the furnace is generally known, it is still not possible to define accurately, on the basis of the electrode supply, whether the electrode ends are located exactly at the desired height. Therefore it is necessary to measure the so-called free length of the electrodes within the furnace, which means the length of the electrodes when measured from the contact shoes downwards.

The best-known method for measuring the free length of the electrodes is the manual method: the measuring rod is forced either manually or by aid of a mallet to penetrate the material bed, until the rod meets the electrode. There are also various electronic devices for measuring the electrode lengths, but the magnetic fields created within an electric-arc furnace are so large that the successful operation of such devices is rather unreliable. Electrodes of a certain type may be hollow inside, so that the devices for measuring the length can be fitted inside the electrode itself, but in manufacturing ferroalloys in an electric-arc furnace, the employed electrodes are solid Soderberg electrodes, wherefore this method of measurement is impossible as well.

When employing the apparatus of the present invention, the electrode ends are detected mechanically, and what is more, the measuring results are reliable and independent of the magnetic fields prevailing within the furnace. The essential novel features of the invention are apparent from the claim 1.

According to the invention, the measuring of the electrode ends is carried out on the control level of the electric-arc furnace, so that the measuring rod is inserted into the furnace through an aperture located in the furnace wall, towards the bottom end of the electrode, by means of a chain feeder pertaining to the apparatus. If the measuring rod hits the electrode at an unsuitable angle, the angle of the measuring rod can be steplessly adjusted in the vertical direction. The number of electrodes contained in an electric-arc furnace is generally three, and the measuring apparatus is constructed and balanced so that it is easily shiftable from one electrode to another. Each electrode can also have its own measuring apparatus. In the following the invention is described in more detail with reference to the appended drawings, wherein FIG. 1 is a side-view illustration of the apparatus of the invention, and FIG. 2 illustrates the apparatus of the invention in vertical cross-section.

As is seen in FIG. 1, the apparatus comprises the frame 1 provided with wheels, and the chain feeder 3 attached to the frame with articulations 2. During the measuring operation, the frame 1 is additionally supported against the furnace 5 by means of the articulations 4. The feeding angle of the chain feeder 3 can be steplessly adjusted in the vertical direction by means of the hydraulic cylinder 6 located in between the frame and the chain feeder. The chain feeder is furnished with the holding guides 8 and 9 of the measuring rod 7 to be inserted into the furnace. The holding guide 8 which is located nearer to the furnace is stationary. The second holding guide 9 is movable so that to the chain feeder there is attached the carriage 10, whereupon the holding guide 9 is mounted. In its initial position, the guide 9 is located at the far end of thechain feeder, with respect to the furnace, and slides therefrom, along with the chain feeding, towards the stationary holding guide 8. The chain feeder is operated pneumatically, and the motor 11 thereof is placed below the chain feeder.

The holding guides of the measuring rod of the chain feeder are operated as follows. The movable holding guide 9 is driven into its initial position, the measuring rod is attached to the guide 9 and the rod is pushed, for instance manually, as far into the furnace as possible, through the aperture 12 in the furnace wall towards the electrode 13 Thereafter the holding guide 9 is pressed pneumatically to be closed and the stationary guide 8 is kept open. Now the rod is pushed into the furnace by aid of the chain feeder; as soon as the guide 9 has reached the stationary guide 8, the stationary guide 8 is closed pneumatically and the movable guide is driven into its initial position. If the measuring rod has not met the bottom end of the electrode, the movable guide, complete with the rod, is again driven towards the stationary guide. If necessary, this procedure can be repeated several times. The vertical angle of the measuring rod can also be adjusted, and the measuring angle indicator 14 indicates directly the position of the electrode with respect to the furnace bottom. In this embodiment, the holding guides and the chain feeder are operated pneumatically, but they can also be operated hydraulically or in some other suitable fashion.

Figure 2:
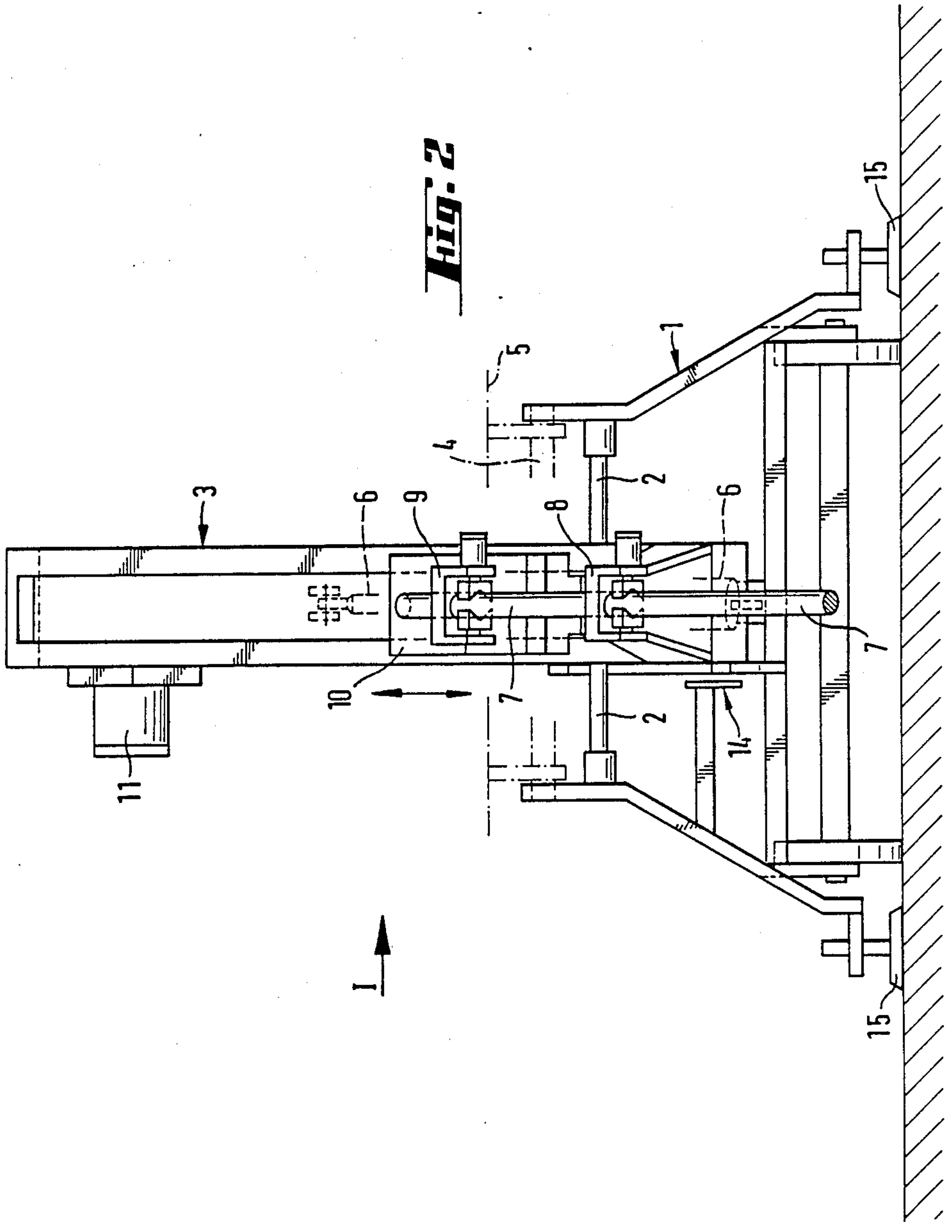

FIG. 2 is a diagrammatic illustration of the measuring apparatus in vertical cross-section. The figure shows how the apparatus can be shifted from wheels to on top of the supports 15 in order to stabilize the arrangement.

As is apparent from the description of the apparatus, the apparatus can be easily installed in conventional furnaces already in use, and it helps considerably in the measuring of the free length of the electrodes.

The utilized measuring rod is a steel rod. During the measurement, the current supply into the electrodes must be switched off, but because the apparatus of the present invention enables the measurement to be carried out relatively quickly, the switching off of the current supply does not cause interruptions in the production, and it is not necessary to lift the electrodes up from the material bed.

I claim:

1. Apparatus for determining the position of the free end of an electrode in an electric furnace, comprising:

a support frame, a feed mechanism connected to the support frame and comprising an elongate guide bar, a first holding member which is mounted to the guide bar so as to remain stationary with respect thereto, a second holding member, and drive means for moving the second holding member longitudinally of the guide bar, each of the holding members being operable selectively to grip or release a measuring rod, whereby a measuring rod fitted to the holding members can be advanced longitudinally of the guide bar by operating the drive means and the holding members, and a power member effective between the support frame and the feed mechanism for adjusting the orientation of the feed mechanism relative to the support frame.

2. Apparatus according to claim 1, wherein the drive means for moving the second holding member include a chain and a carriage the carriage being movable longitudinally of the guide bar by the chain, and the second holding member is attached to the carriage.

3. Apparatus according to claim 1, wherein the drive means and the holding members are operable by pneumatic pressure.

4. Apparatus according to claim 1, wherein the power member comprises a hydraulic cylinder.

5. Apparatus according to claim 1, further comprising an angle indicator for indicating the orientation of the guide bar.

6. A method for determining the position of the free end of an electrode in an electric furnace employing an elongate guide bar, a first holding member which is mounted to the guide bar so as to remain stationary with respect thereto, a second holding member, and drive means for moving the second holding member longitudinally of the guide bar, each of the holding members being operable selectively to grip or release a measuring rod, said method comprising disposing the guide bar outside the electric furnace, fitting a measuring rod in the first and second holding members, operating the drive means and the holding members to feed the measuring rod into the electric furnace, towards the free end of the electrode, and adjusting the orientation of the guide bar so that the guide bar engages the free end of the electrode.

7. A method according to claim 6, comprising positioning the guide bar so that the first holding member is nearer to the furnace than is the second holding member.

8. A method according to claim 6, comprising operating the drive means and the holding members by pneumatic pressure.

* * * * *